United States Patent [19]

Onimaru et al.

[11] Patent Number: 4,802,706
[45] Date of Patent: Feb. 7, 1989

[54] ROTARY SEAT FOR VEHICLE

[75] Inventors: Sadahisa Onimaru, Nishio; Toshiaki Shimogawa, Okazaki; Masahiro Taguchi, Hazu; Satosi Kuwakado, Nukata, all of Japan

[73] Assignee: Nippon Soken, Inc., Nishio, Japan

[21] Appl. No.: 870,354

[22] Filed: Jun. 4, 1986

[30] Foreign Application Priority Data

Jun. 4, 1985 [JP] Japan ................................ 60-121199
Jul. 11, 1985 [JP] Japan ................................ 60-153004

[51] Int. Cl.$^4$ .............................................. B60N 1/02
[52] U.S. Cl. ..................................... 296/68; 296/65.1; 297/349; 297/330; 108/140; 248/425
[58] Field of Search ............... 296/65 R, 68; 297/330, 297/349; 108/140, 142; 248/425; 192/84 R, 84 B; 364/425, 424

[56] References Cited

U.S. PATENT DOCUMENTS

| | | | |
|---|---|---|---|
| 2,290,464 | 7/1942 | Buchheit | 296/65 R |
| 2,587,679 | 3/1952 | Atkinson | 296/65 R |
| 2,962,139 | 11/1960 | Straub | 192/84 B |
| 4,471,860 | 9/1984 | Yamada | 192/84 R |
| 4,472,710 | 9/1984 | Iha | 74/625 |
| 4,523,136 | 6/1985 | Dudeck et al. | 296/65 R X |
| 4,566,576 | 1/1986 | Moriya et al. | 192/84 C |
| 4,600,239 | 7/1986 | Gerstein et al. | 296/65 R X |

FOREIGN PATENT DOCUMENTS

| | | |
|---|---|---|
| 1153645 | 8/1963 | Fed. Rep. of Germany . |
| 2151969 | 4/1973 | Fed. Rep. of Germany . |
| 57-22923 | 2/1982 | Japan . |
| 58-214423 | 12/1983 | Japan . |
| 206244 | 11/1984 | Japan . |
| 799685 | 8/1958 | United Kingdom . |

Primary Examiner—Dennis H. Pedder
Attorney, Agent, or Firm—Cushman, Darby & Cushman

[57] ABSTRACT

A rotary seat for a vehicle has a seat cushion member rotably supported on a support shaft vertically mounted on the vehicle floor. Driving apparatus is connected to the seat cushion member for automatically rotating the seat cushion member between a direction toward the front of the vehicle and a direction toward a side door of the vehicle when the seat cushion member is not occupied. Disconnecting equipment is included for disconnecting the driving apparatus from the seat cushion member to allow the seat cushion member to be manually rotated when the seat cushion member is occupied. Control devices are provided for controlling the driving apparatus and the disconnecting equipment to place the seat cushion member in an automatic rotating mode or a manual rotating mode depending upon whether the seat is occupied.

5 Claims, 20 Drawing Sheets

F I G.1
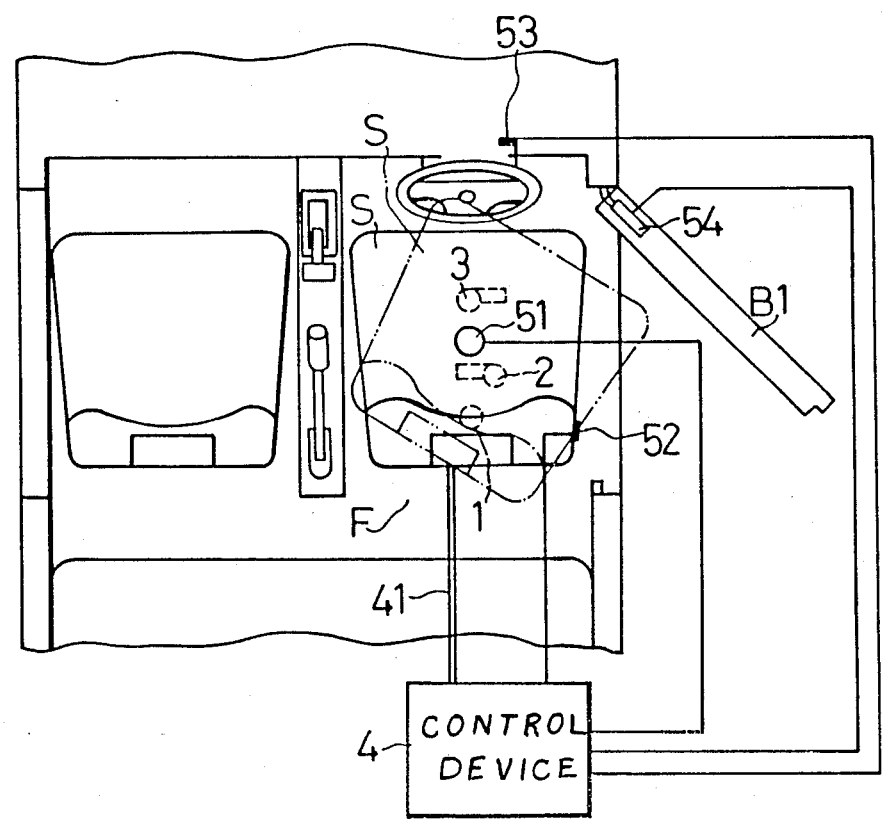

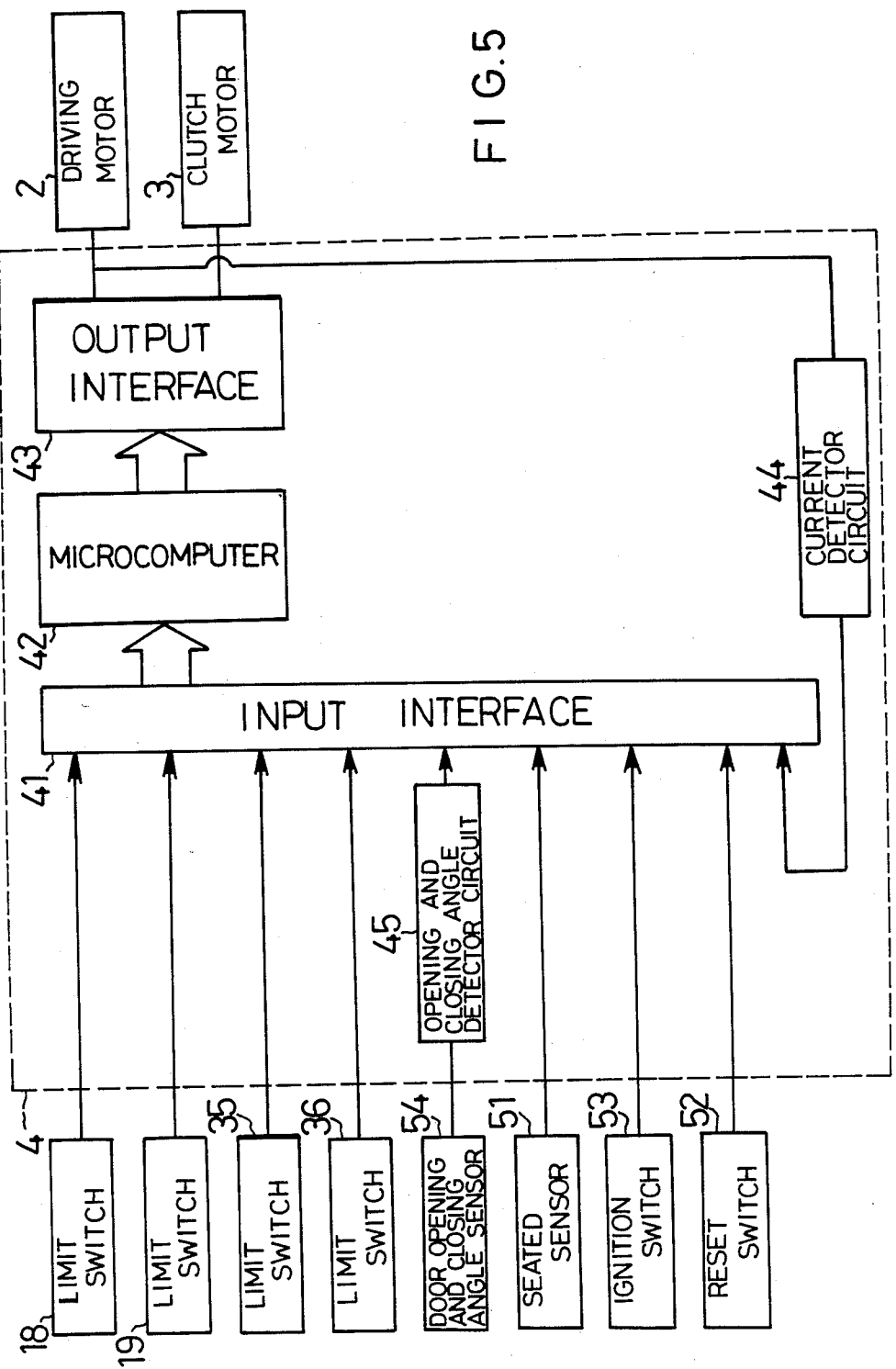

F I G.13
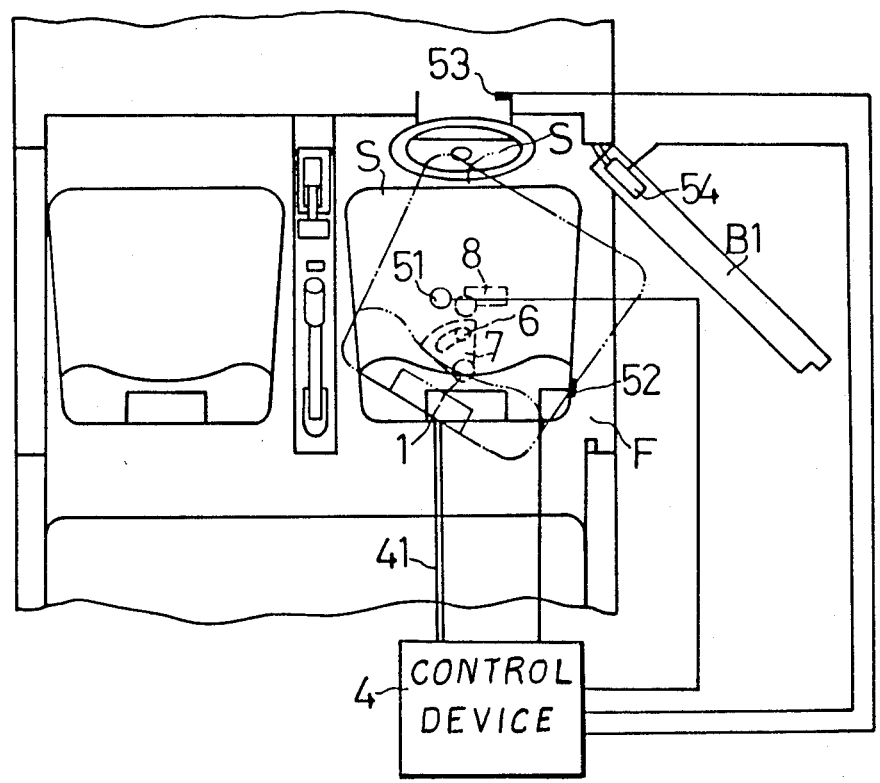

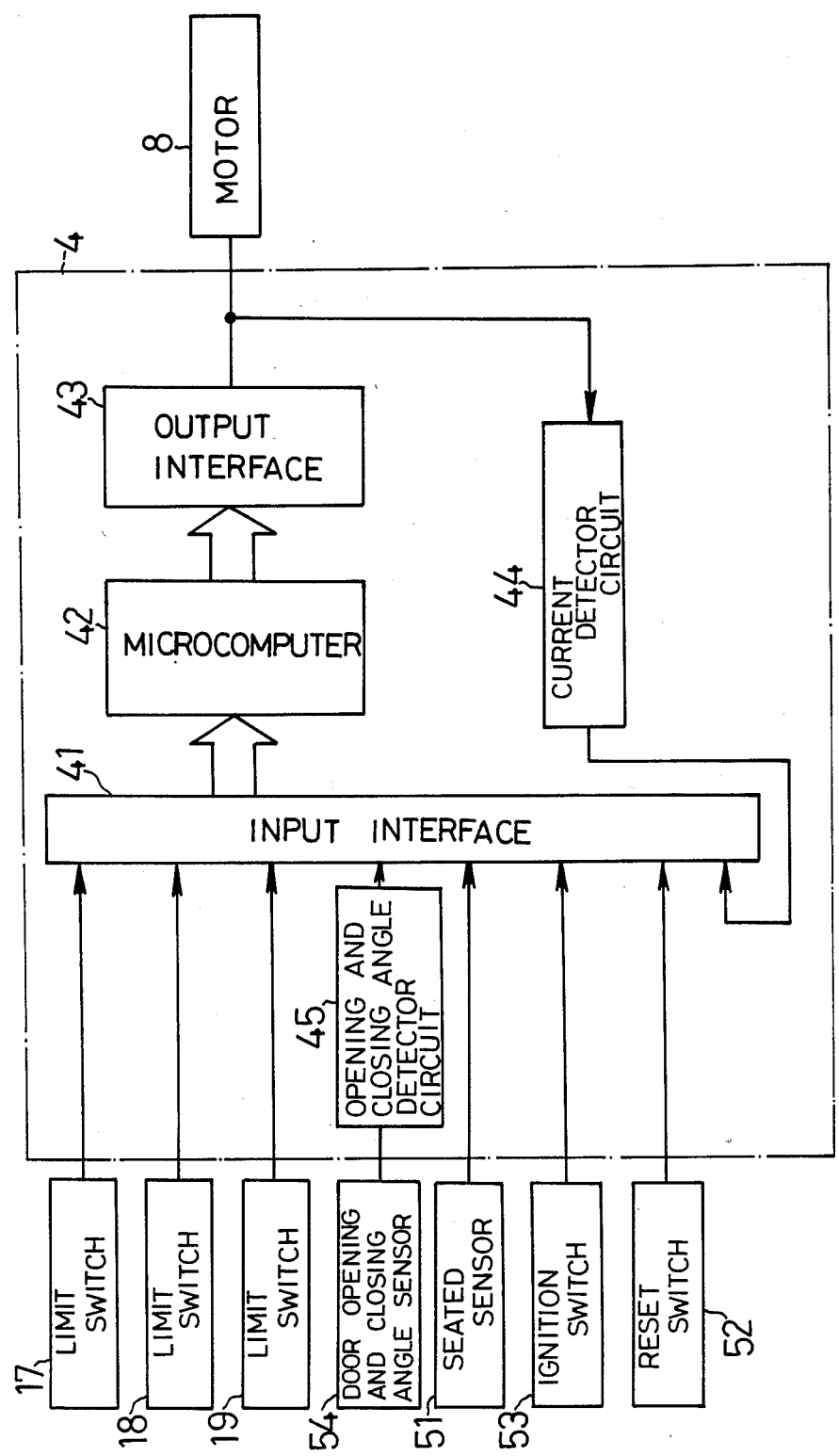

F I G. 19
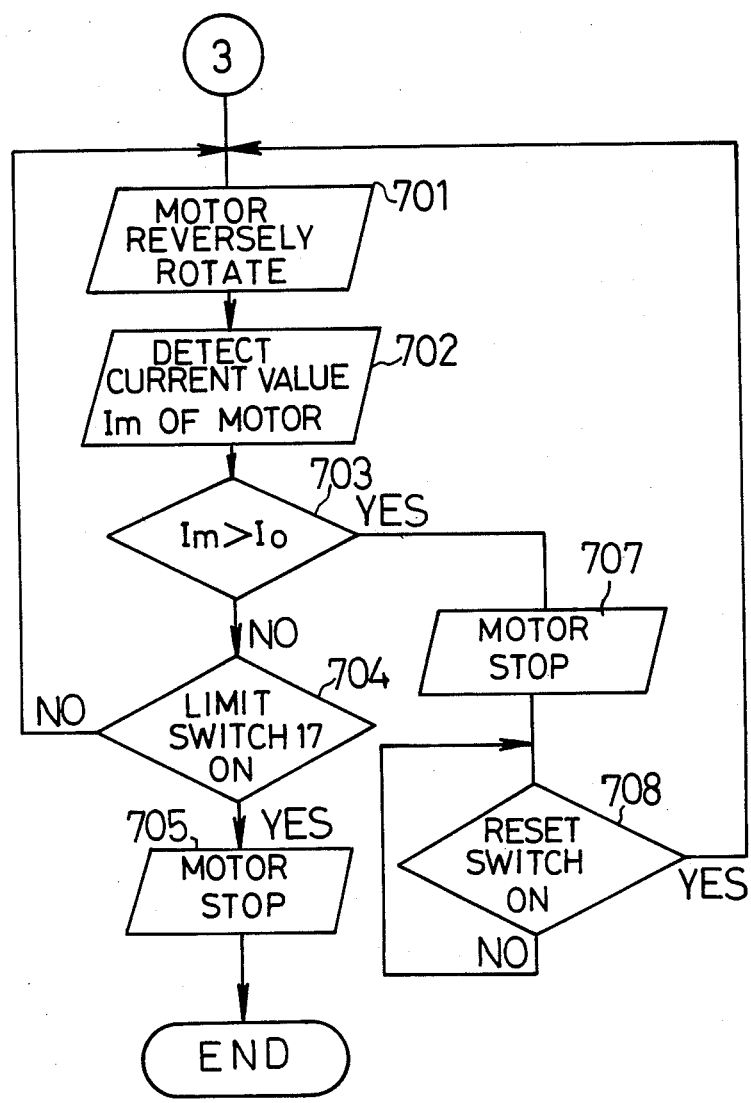

ROTARY SEAT FOR VEHICLE

BACKGROUND OF THE INVENTION

1. Field of the Invention

The present invention relates to a rotary seat for a vehicle in which the seat is rotated so as to facilitate mounting and dismounting the vehicle. 2. Description of the Prior Art Since the driver's seat for a vehicle is normally adjusted so as to maintain an optimum driver's position during his driving, the occupant is compelled to take a relatively unnatural position when mounting and dismounting the vehicle.

In view of the foregoing, a rotary seat has been proposed (See Japanese patent applications Laid-Open Nos. 22,923/82 and 214,423/83, in which the seat is rotated toward the door when a person mounts or dismounts the vehicle so as to render the mounting and dismounting.

In the above-described conventional rotary seats, in the former application, the seat cushion is supported on the floor of the vehicle and is manually rotated, whereas in the latter application, it is fully automatically rotated by means of a driving motor. In case of manual operation, the seat has to be rotated by hand inwardly and outwardly of the vehicle every time the occupant starts to mount or has already dismounted the vehicle, which is cumbersome. In case of automatic operation, the occupant has to adjust his position relative to the automatic rotation of the seat during the mounting and dismounting, which poses a problem in that the occupant unavoidably becomes tense.

SUMMARY OF THE INVENTION

It is therefore an object of the present invention to provide a rotary seat for a vehicle, which enables the occupant to suitably select an automatic mode or a manual mode in mounting and dismounting the vehicle.

The rotary seat of the present invention comprises a support shaft mounted upright on a floor of the vehicle, a seat cushion member rotatably supported on the support shaft, driving means disconnectably connected to the seat cushion member to rotate and drive the seat cushion member between a position facing the front of the vehicle and a position facing the side door, means for connecting and disconnecting the connection between the seat cushion member and the driving means to enable the seat cushion member to be manually turned, and control means for controlling connection and disconnection of the driving means according to an opening and a closing of a door used to mount and dismount the vehicle and according to whether or not an occupant is seated on the seat cushion member.

BRIEF DESCRIPTION OF THE DRAWINGS

FIGS. 1 to 12 show a first embodiment according to the present invention.

FIG. 1 is a plan view of a driver's seat of a vehicle;

FIG. 2 is a fragmentary section of the seat, taken on line II—II of FIG. 3;

FIG. 3 is a fragmentary section of a seat rotating mechanism, taken on line III—III of FIG. 2;

FIG. 4 is a sectional view of a gear box taken on line IV—IV of FIG. 3;

FIG. 5 is a block diagram showing a hard structure of a control device;

FIGS. 7 to 12 are program flow charts of a computer;

FIGS. 13 to 20 show a second embodiment of the present invention;

FIG. 13 is a plan view of a driver's seat of a vehicle;

FIG. 14 is a fragmentary sectional side view of the seat taken on line XIV—XIV of FIG. 15;

FIG. 15 is a plan view as viewed from the bottom of the seat;

FIG. 16 is a block diagram showing a hard structure of a control device;

FIGS. 18 to 20 are program flow charts of a computer;

FIG. 21 is a fragmentary sectional side view of the seat taken on line XXI—XXI of FIG. 22; and FIG. 22 is a plan view as view as viewed from the bottom of the seat.

DETAILED DESCRIPTION OF THE PREFERRED EMBODIMENTS

Figure 2:
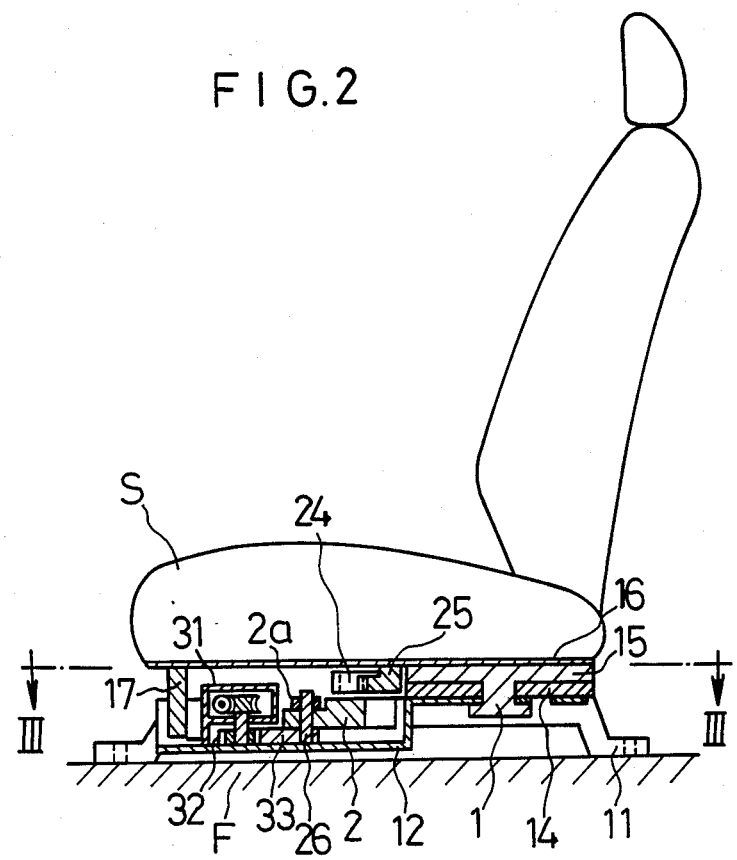

In the various embodiments, like reference numerals denote like structure.

FIG. 1 shows a first embodiment of the present invention. A seat cushion member S of a driver's seat is rotatably supported on a support shaft 1 mounted vertically on vehicle floor F, and may be rotated as indicated by the chain lines. Under the seat cushion member S is disposed a motor 2 for rotating and driving the cushion member S, and a motor 3 for actuation a clutch mechanism. The motors 2 and 3 are connected by means of a cable 41 to a control device 4 to control the rotation of the seat member S.

Connected to the control device 4 are a seat sensor 51 embedded into the seat cushion member S, a reset switch 52 provided on the seat cushion member S, an ignition switch 53 provided on a handle portion, and a sensor 54 for detecting a door-opening and closing angle when door B1 is opened and closed.

The sensor 54 has a linear potentiometer which generates an output signal according to the opening and closing angle of the door.

Figure 3:
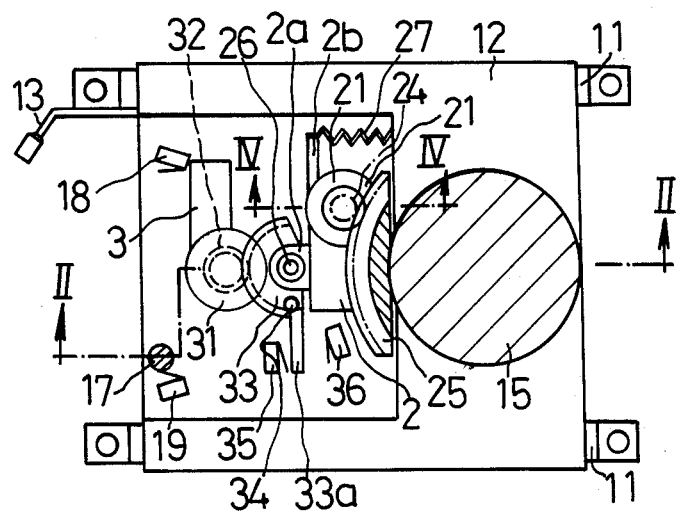

Details of the rotating mechanism for the driver's seat are shown in FIGS. 2 and 3. FIG. 2 is a sectional view taken on line II—II of FIG. 3, and FIG. 3 is a sectional view taken on line III—III of FIG. 2.

In the figures, reference numeral 11 designates parallel rails provided on the floor F which run toward the back and front of the vehicle (in the lateral direction in the figure), and a base plate 12 is slidable placed on and along the rails 11. The base plate 12 is moved to a suitable position on the rails 11 and positioned by operating a lever 13 having a well known construction.

A circular sliding plate 14 is provided on the upper surface of the back portion of the base plate 12, and a sliding plate 15 of the same shape is brought into abutment with the sliding plate 14 from the top. The support shaft 1 is projected from the center of the lower surface of the sliding plate 15 and extends through the sliding plate 14. The sliding plate 15 is rotatable about the support shaft 1. A support plate 16 supporting the seat cushion member S is integrally joined to the sliding plate 15.

Figure 4:
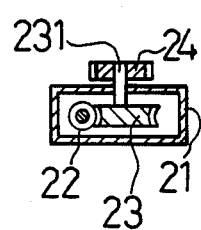

The front portion of the base plate 12 is stepped and lowered in level, and the rotating motor 2 is provided on a lower portion. The motor 2 is integral with a gear box 21, within which a worm gear 22 mounted on the motor shaft and a worm wheel 23 meshed with the worm 22 are disposed as shown in FIG. 4. A rotating shaft 231 of the worm wheel 23 projects from the upper surface of the gear box 21, and a pinion 24 is provided on the extreme end thereof. The pinion 24 meshes with a rack 25 provided on the undersurface of the support plate 16, the rack 25 having a tooth-profile surface in the form a circular arc about the support shaft 1. When the motor 2 rotates, the turning force is transmitted from the pinion 24 to the rack 25 to rotate the seat about the support shaft 1.

A support portion 2a projects from the side wall of a housing of the motor 2, the support portion 2a being rotatably coupled to a shaft member 26 provided on the base plate 12. Also, a level portion 2b is projected from the housing, the level portion 2b having an extreme end connected to a shoulder of the base plate 12 by means of a spring 27. The motor 2 is biased clockwise about the shaft member 26 by the spring 27, and the pinion 24 elastically comes into abutment with and meshes with the rack 25.

The clutch motor 3 for actuating a clutch mechanism, the construction of which will be described in detail later, is also provided on the base plate 12. The motor 3 is integral with the gear box 31, which has the same construction as that of the gear box 21. A pinion 32 provided on the extreme end of the rotating shaft projecting from the gear box 31 meshes with a semi-circular rack 33 rotatably connected to the shaft member 26. When the motor 3 rotates, the rack 33, to which a turning force is applied by the pinion 32, rotates counter-clockwise about the shaft member 26, and a pin 34 provided on the rack 33 comes into abutment with the housing for the motor 2. Thereby, the motor 2 rotates integral with the rack 33 counterclockwise against the action of the spring 27 to release engagement between the pinion 24 and the rack 25.

The rotational end of the seat cushion member S is detected as rotating when a rod-like striker 17, projecting from the undersurface of the support plate 16, comes into abutment with limit switches 18, 19 provided on the base plate 12, and the rotational end of the rack 33 is detected as rotating when a projecting striker portion 33a comes into abutment with limit switches 35, 36.

A block diagram of the control device 4 is shown in FIG. 5. The device 4 comprises an input interface 41, a microcomputer 42, an output interface 43, a current detector circuit 44 for detecting a current value of the motor 2, and an opening and closing angle detector circuit 45 for converting an impedance of an output signal of an opening and closing angle sensor 54 to another value.

Figure 6A:
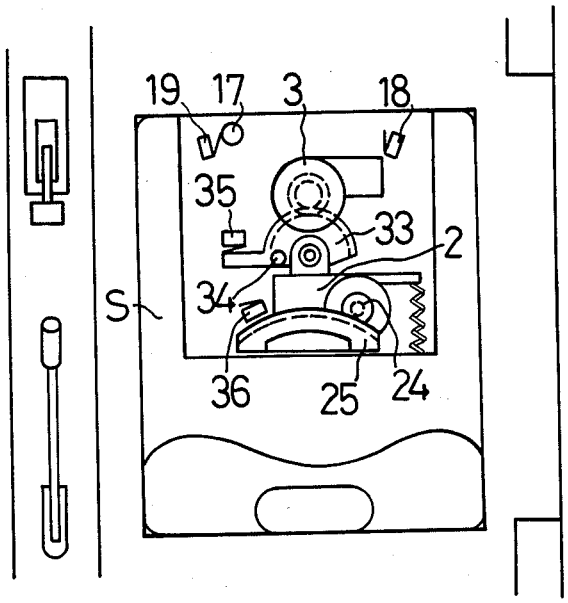
FIGS. 6A to 6D are schematic plan views showing the operation of the seat.
Figure 6B:
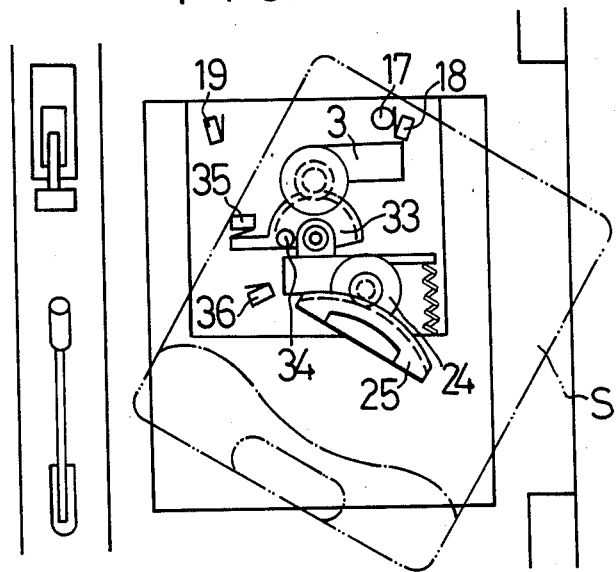
Figure 6C:
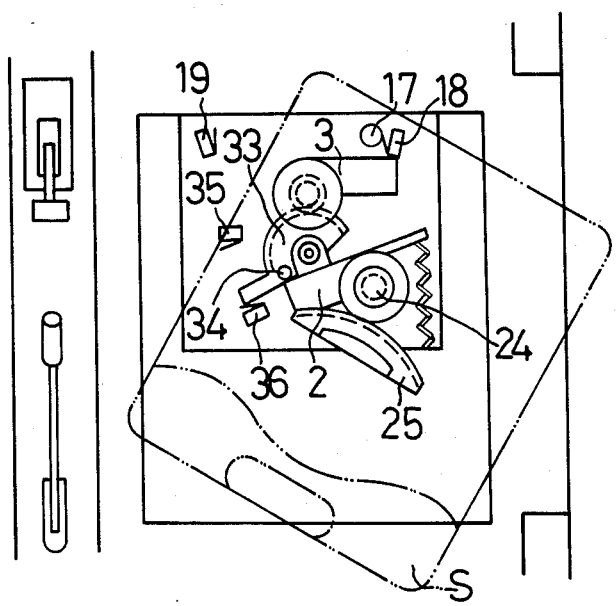

One example of the operation of the vehicle seat will be explained with reference to the views of FIGS. 6A and 6B and program flow charts of FIGS. 7 to 10.

Where the seat cushion member S is in the original position shown in FIG. 6A, in Step 101 of FIG. 7, parking of the vehicle is confirmed by turning off an ignition switch 53, and subsequently, the door opening and closing angle $\theta d$ is detected (Step 102). When the door B1 is opened and the opening and closing angle $\theta d$ exceeds a seat rotatable angle $\theta 1$, the actuation of the seat sensor 51 is checked (Steps 103 and 104). If the seat sensor 51 is actuated, the process proceeds to the program of FIG. 9, and seat sensor 51 is not activated, the step proceeds to the program of FIG. 8.

Figure 8:
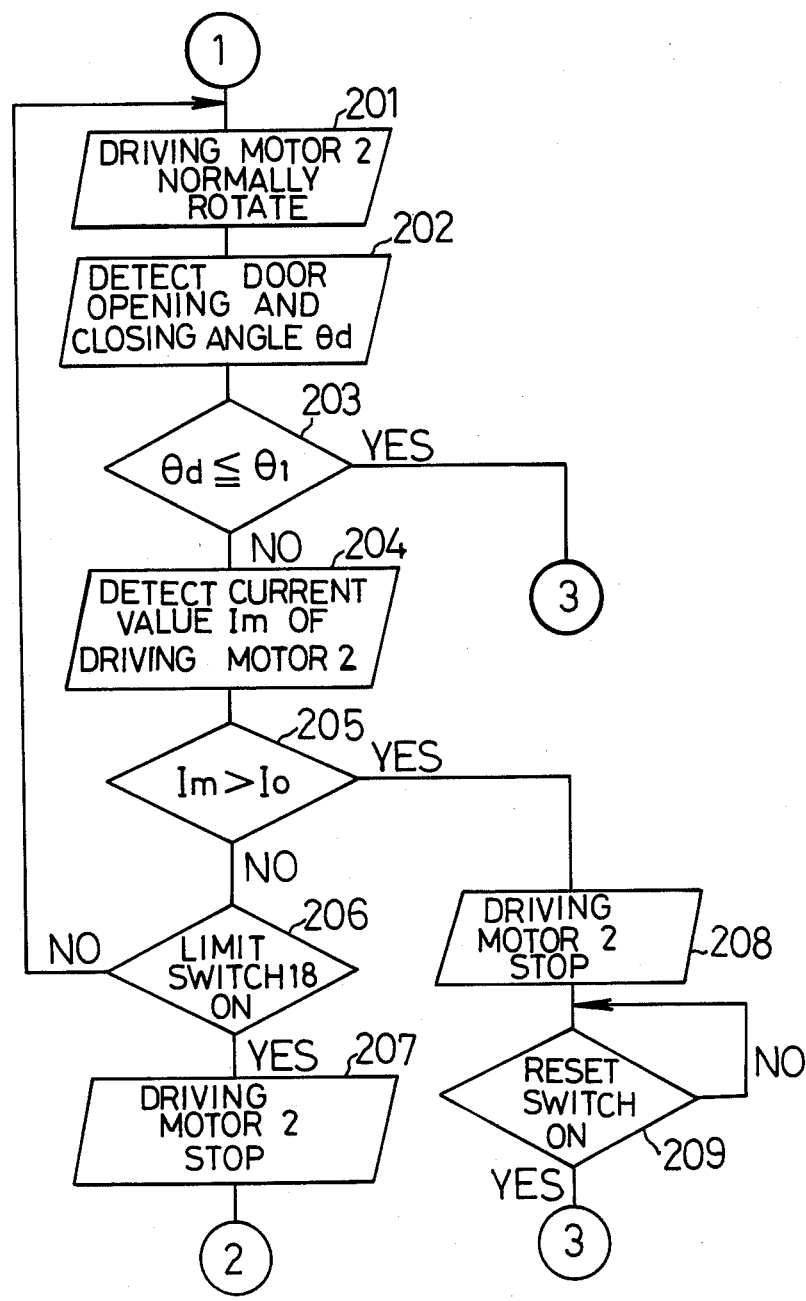

In FIG. 8, in Step 201, the driving motor 2 is normally rotated to turn the seat cushion member S toward the side door opening until the limit switch 18 is turned ON (Steps 201, 206 and 207). In this case, the position of the seat cushion member S is shown in FIG. 6B. Thereafter, the process proceeds to the program of FIG. 9. Halfway during the above-described rotation, when the angle $\theta d$ is below the angle $\theta 1$, it is determined whether mounting has stopped and the process proceeds to the program of FIG. 10 (Step 203). If a current Im of the motor 2 exceeds an allowable value Io, overload of the motor is determined and the motor 2 is stopped (Steps 204, 205 and 208), and after confirmation of the depression of the reset switch 52, the process proceeds to the program of FIG. 10 (Step 209).

Figure 6D:
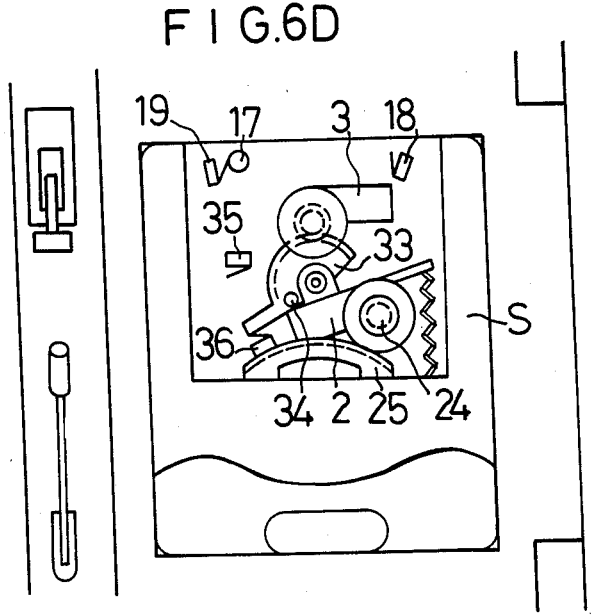
Figure 9:
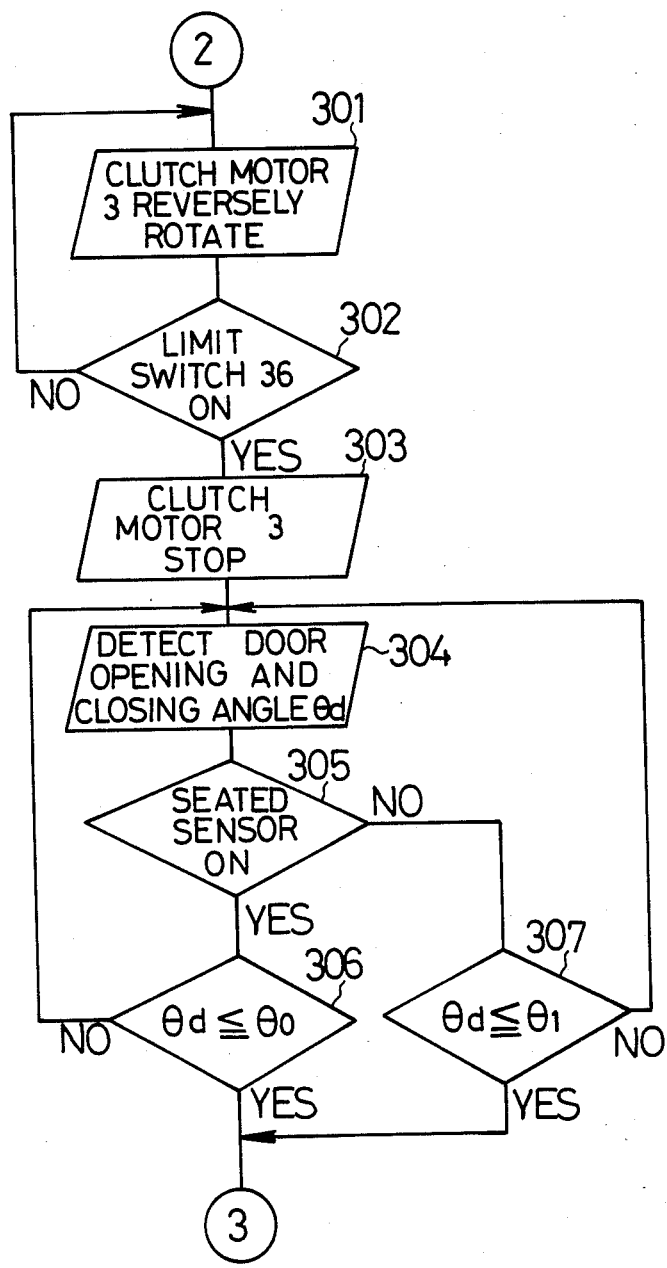

In FIG. 9, the clutch motor 3 is reversely rotated until the limit switch 36 is turned ON (Steps 301, 302 and 303). In this state, the pin 34 of the rack 33 abuts motor 2 and the motor 2 is rotated to release the engagement between the pinion 24 and the rack 25. Accordingly, if the occupant is seated and twisted in his waist, the seat cushion member S is rotated inwardly of the vehicle and returned to the original forward-facing position (FIG. 6D). When in this state, the door B1 is closed, it is detected that the door opening and closing angle $\theta d$ is less than the angle $\theta o$, and the process proceeds to the program of FIG. 10. In Steps 401, 402 and 403, the motor 3 is normally rotated until the limit switch 35 is turned ON. Thereby the pinion 24 and rack 25 are again brought into engagement and the seat cushion S assumes its locked state (FIG. 6A). In this case, Step 404 and the following steps are not substantially executed.

Figure 10:
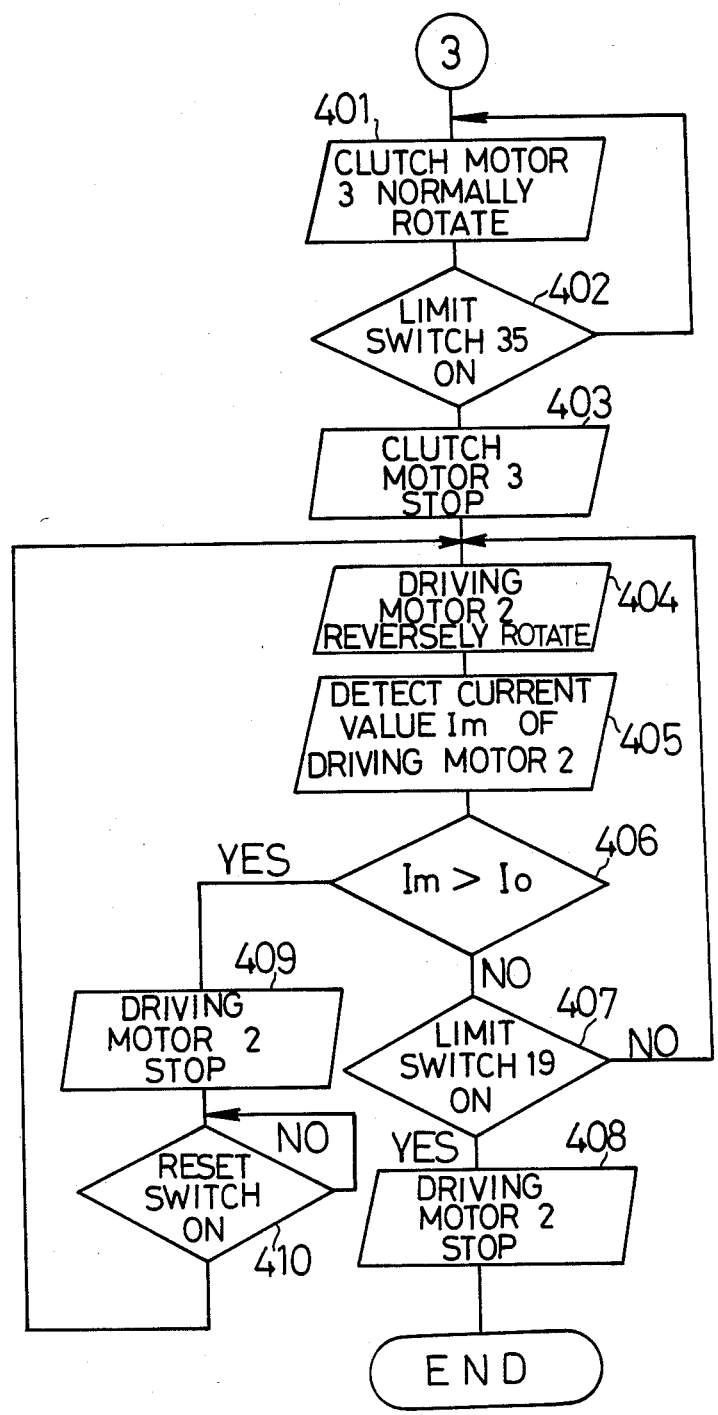

When during the program in FIG. 9, the occupant is not seated with the seat cushion member 3 facing outwardly of the vehicle, and the angle $\theta d$ is less than the angle $\theta 1$, the process proceeds to the program of FIG. 10 (Steps 305 and 307), which corresponds to the case where the occupant has stopped mounting the vehicle. In Steps 401 to 403 in FIG. 10, the pinion 24 is brought into engagement with the rack 25 and then the motor 2 is reversely rotated to rotate the seat cushion member S inwardly and return it to the original forward-facing position (Steps 404, 407 and 408). If halfway during the rotation, the current Im of the motor 2 exceeds the allowable Io, an overload of the motor is detected and the motor 2 is stopped (Steps 405, 406 and 409). Then, when it is confirmed that the reset switch 52 is depressed, the motor 2 is again rotated (Step 410).

Figure 7:
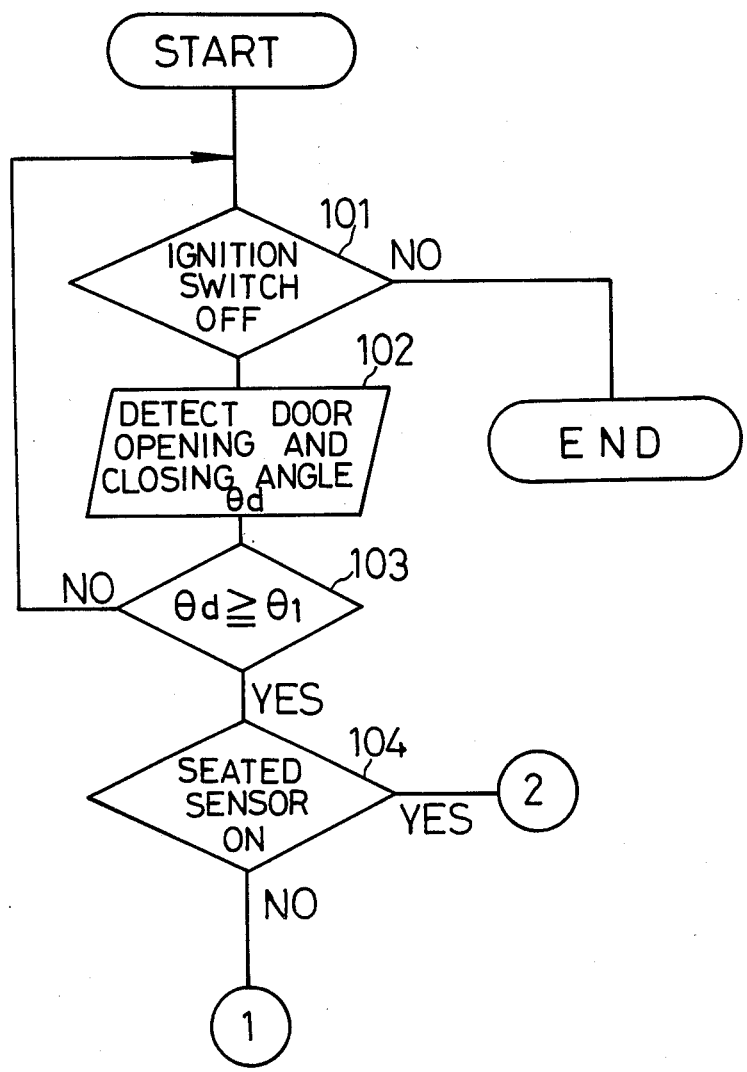

In Step 104 of FIG. 7, where the seated sensor 51 is actuated, that is, where the occupant is seated at the original forward-facing position of the seat cushion member S, the program of FIG. 9 is executed. Namely, in Steps 301 to 303, engagement between the pinion 24 and rack 25 is released and therefore, the seat cushion member s is rotated toward the side door while adjusting to the twist of the occupant's waist. When the occupant dismounts and starts closing the door, the process proceeds to Steps 304, 305 and 307 in order, and consecutively, the program of FIG. 10 is executed and the seat cushion member S is automatically rotated inwardly of the vehicle and returns to its original forward-facing position.

Figure 11:
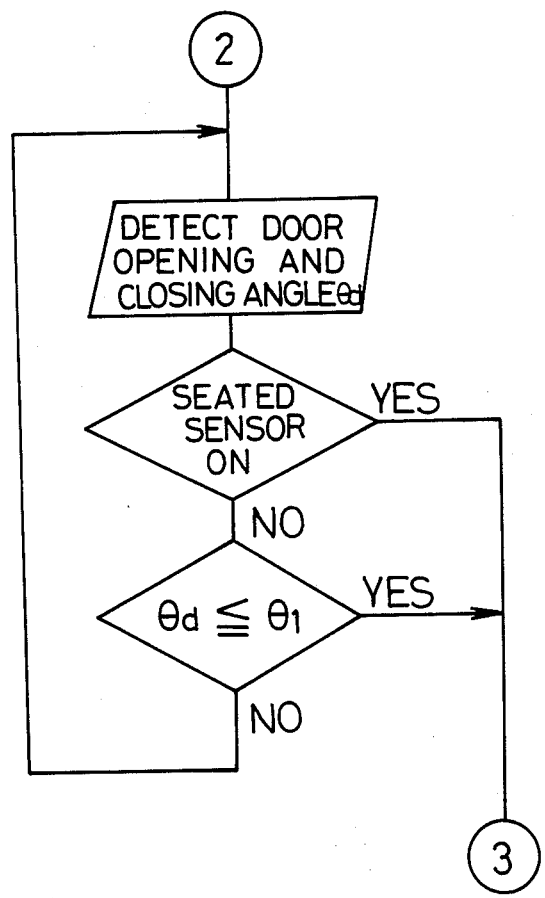
Figure 12:
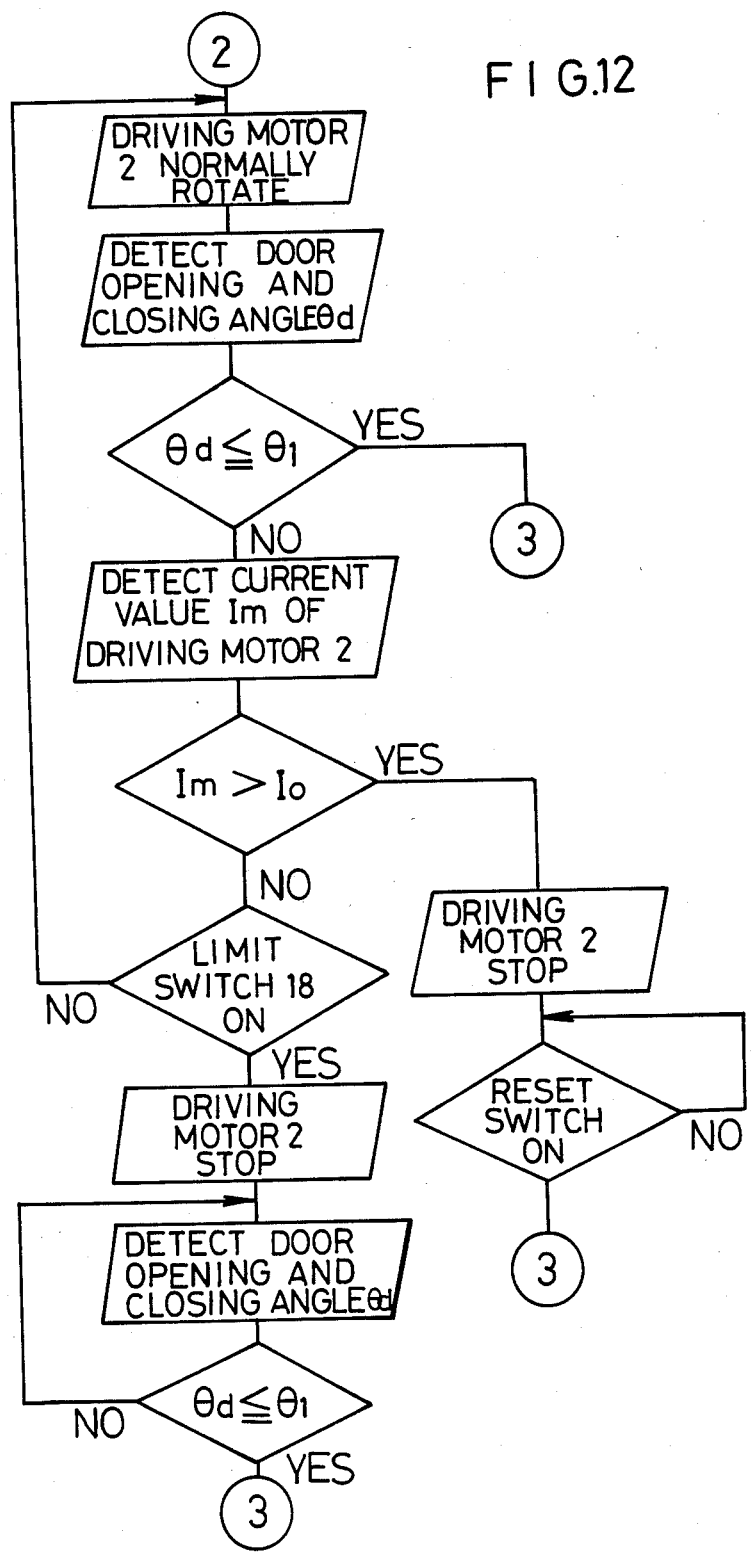

According to the above-described embodiment, when the door is opened to mount the vehicle, the seat cushion member S is automatically rotated toward the side door, and when the door starts to be closed after the occupant has dismounted, the seat cushion member S is automatically rotated inwardly of the vehicle and returned to its original forward-facing position. During the mounting and dismounting of the vehicle, the connection between the seat cushion member S and the rotating motor 2 is cut off by means of the clutch mechanism, whereby the seat cushion member S follows the movement of the occupant's waist for rotation. In this manner, trouble may be saved for the occupant to rotate the seat inwardly and outwardly, and in addition, the mounting and dismounting operation can be effected at the occupant's own pace.

Where either the mounting or dismounting is automatically effected, in the former case, the program of FIG. 11 is inserted between the programs of FIGS. 8 and 10, whereas in the latter case, the program of FIG. 12 is inserted between the programs of FIGS. 7 and 10.

The driving mechanism for the rotary plate is not limited to that of the above-described embodiment. A hydraulically or pneumatically operated driving mechanism can be used.

The clutch mechanism is not limited to that of the above-described embodiment, but clutches of other mechanisms such as an electromagnetic clutch can be used.

The detection of the door opening and closing angle is not limited to that of the above-described embodiment, but a switch or a pulse encoder can be provided in place of a potentiometer. Alternatively, a sensor may be provided at a door hinge portion, or a position of a door may be measured by supersonic wave or the like to detect the door opening and closing angle.

In the above-described embodiment, a pattern selecting switch can be added to select an operating pattern according to the desires of the occupant.

In addition, a sensor can be provided on a parking brake, a shift level or the like in place of an ignition switch to confirm the stoppage of the vehicle. Or, a vehicle speed sensor can be used to confirm the stoppage of the vehicle.

While in the above-described embodiment, the door opening and closing angle sensor 54 is used to generate a signal for returning the seat cushion member S in the direction of the vehicle front after the occupant has been unseated to dismount, and alternative is for the unseating of the occupant to be detected by the signal from the seat sensor 51 and the seat cushion member S is then returned to the front by said seat sensor signal.

The above-described embodiment can be also designed so that a pulse generator is mounted on the driving shafts of the rotating motor 2 and clutch motor 3, and the rotational angle of the seat cushion member S and the connection and disconnection of the clutch mechanism may be determined by the number of pulses generated therefrom, without using the limit switches 18, 19, 35 and 36.

While in the above-described embodiment, if the door opening and closing angle is less than a predetermined value, the seat cushion member S is rotated in the direction of the front, this embodiment can be designed so that the movement of the door in its opening direction or in its closing direction is determined by the output of the door opening and closing angle sensor 54, and if the door is moving in the closing direction, the seat cushion member S is rotated in the direction of the front of the vehicle.

A second embodiment of the present invention is shown in FIG. 13. The seat cushion member S of the driver's seat is rotatably supported on the support shaft 1 mounted vertically on the vehicle floor F, and rotates between the direction of the vehicle front (upwardly in the figure) and the direction of the side door chain lines in the figure). A rod-like member 6 is projectingly provided at a position eccentric with the center of rotation of the seat cushion member S and on the undersurface thereof, and an engaging member 7 formed with engaging surfaces described later is disposed on the floor F. The engaging member 7 is rotatably moved by means of the motor 8 and connected to the control device 4 by means of the cable 41.

Connected to the control device 4 are a seat sensor 51 embedded into the seat cushion member S, a reset switch 52 provided on the seat cushion member S, an ignition switch 53 provided on a handle portion, a door opening and closing angle sensor 54 provided on the side door B1.

The opening and closing sensor 54 has a linear potentiometer which generates an output signal according to the opening and closing angle of the door.

Figure 14:
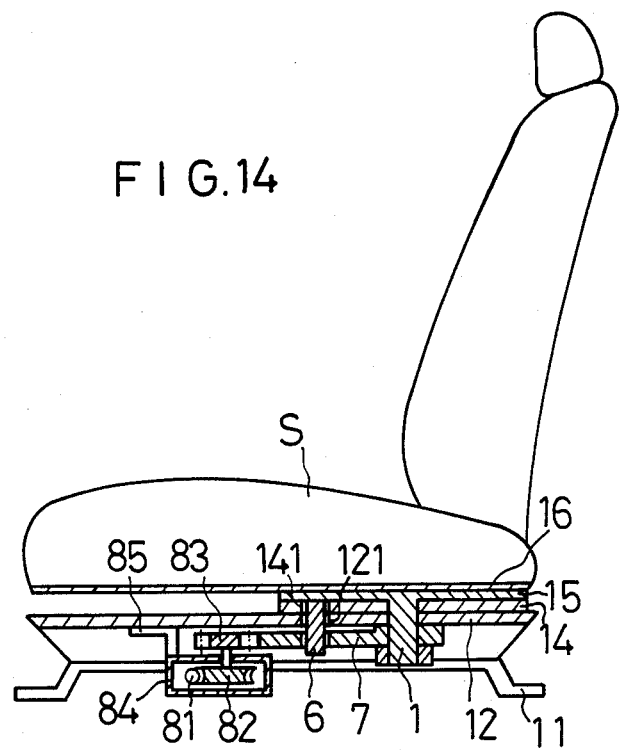
Figure 15:
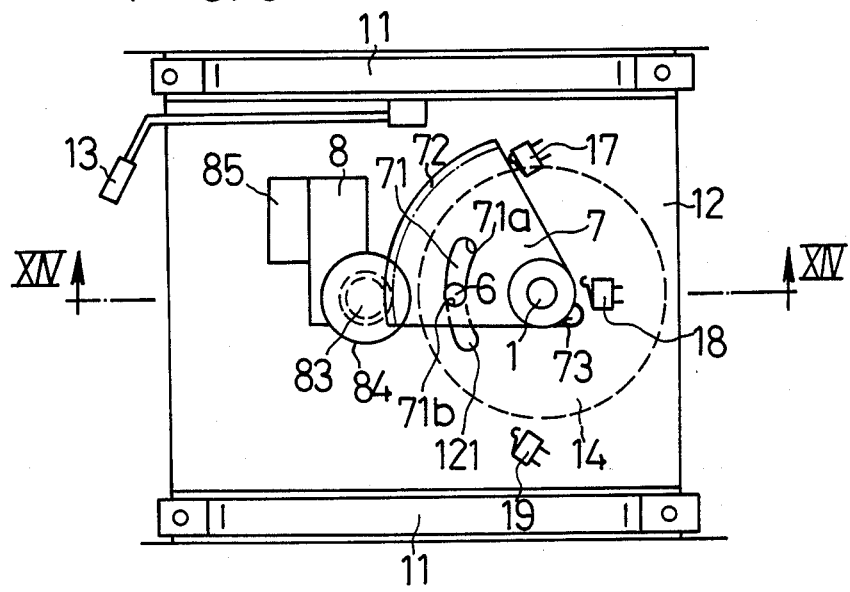

Details of the rotating mechanism for the driver's seat are shown in FIGS. 14 and 15. FIG. 14 is a sectional view taken on line XiV—XIV of FIG. 15, and FIG. 15 is a plan view as viewed from the bottom of the seat cushion member S.

In the figures, reference numeral 11 designates parallel rails directed toward the front and back of the vehicle (lateral direction in the figure), and a base plate 12 is slidably placed on the rails 11. The base plate 12 is moved to a suitable position on the rails 11 by operating the lever 13 having a well known construction.

A circular sliding plate 14 is provided on the upper surface of the back portion of the base plate 12, and a sliding plate 15 of the same shape is brought into abutment with the sliding palte 14. The support shaft 1 is provided on the undersurface of plate 15 in the center thereof and extends through the sliding plate 14. The sliding plate 15 is rotatable about the support shaft 1. A support plate 16 supporting the seat cushion member S is joined and secured to the sliding plate 15.

The rod-like member 6 is projectingly provided at an eccentric position with respect to shaft 1 toward the front of seat cushion member S. Rod-like member 6 extends downwardly through slots 141, 121 of the sliding plate 14 and base plate 12. The slots 141, 121 have the same configuration in the form of a circular arc about the support shaft 1 (FIG. 15) and are formed at a position outwardly (downwardly in the figure) of the vehicle from the center line of the base plate 12. The seat cushion member S is placed on the support plate 16 and is rotatably movable in the direction of the front of the vehicle and in the direction of the side door, while the rod-like member 6 comes into abutment with both the ends of the slot 121. Thus, the rod-like member 6 has a relative locus defined by both ends of slot 121.

An engaging member 7 is disposed beneath and parallel to the base plate 12. The engaging member 7 is in the form of a plate body having a pre-shaped sector, the center portion of which is rotatably coupled to the support shaft 1. The plate surface of the engaging member 7 is formed with a slot 71 having the same configuration as that of the slot 121 and on the same circumference as said slot 121, and the extreme end of the rod-like member 6 is inserted into the slot 71. A tooth profile 72 is formed on the outer circumferential surface of the engaging member 7, and a pinion 83 is meshed with the tooth profile 72. The pinion 83 is forwardly and reversely rotated, with a construction to be described later, by means of the motor 8 provided on the undersurface of the base plate 12.

As the pinion 83 rotates, the engaging member 7 rotates about the support shaft 1, and the engaging surfaces 71a, 71b on the both ends of the slot 71 come into engagement with the rod-like member 6 to move the latter along the slot 121. Thereby, the seat cushion member S is automatically rotated inwardly and outwardly of the vehicle.

The pinion 83 is secured to a rotary shaft of a worm wheel 82 (FIG. 14) provided within a gear box 84, and the worm wheel 82 is meshed with a worm gear 81. The worm gear 81 is mounted on the rotary shaft of a motor 8 projecting into the gear box 84. The motor 8 is secured to the base plate 12 by means of a stay 85.

Three limit switches 17, 18 and 19 are disposed on the undersurface of the base plate 12, and when the engaging member 7 is rotated to the inner end (a shown in FIG. 15), the intermediate point or the outer end, the aforesaid limit switches 17 to 19 are actuated. When the engaging member 7 is moved to the intermediate point, the slot 71 completely registers (coincides) with the slot 121 of the base plate 12. At that time, the aforesaid limit switch 18 is actuated by a striker portion 73 projecting from the center portion of the engaging member 7.

A block diagram of the control device 4 is shown in FIG. 16. The device 4 comprises an input interface 41, a microcomputer 42, an output interface 43, a current detector circuit 44 for detecting a current value of the motor 8, and a door opening and closing angle detector circuit 45 for converting an output signal of the door opening and closing angle sensor 54 into an impedance.

Figure 17A:
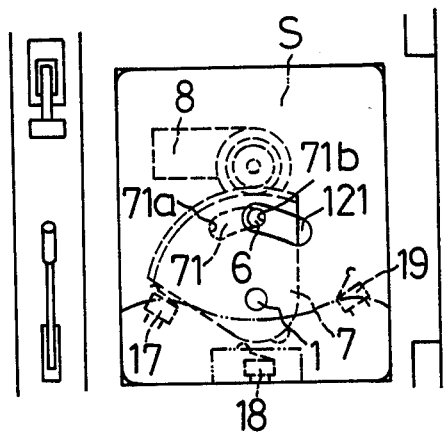
FIGS. 17A to 17D are schematic plan views showing the operation of the seat.

One example of the operation of the vehicle seat will be explained with reference to the diagrams FIGS. 17A to 17D, and the program flow charts of FIGS. 18 to 22.

Where the seat cushion member S is in the position shown in FIG. 17A, in Step 501 of FIG. 18, parking of the vehicle is confirmed by detecting the turning off of ignition switch 53, and subsequently, the door opening and closing angle $\theta d$ is detected (Step 502). When the door B1 opens and opening angle $\theta d$ thereof exceeds angle $\theta_1$ of the allowable rotation of the seat cushion member S, the active or nonactive operation of seat sensor 51 is checked (Step 503, Step 504). When the seat sensor 51 is in operation, the process proceeds to Step 617 shown in FIG. 20, and when the sensor is not in operation, the process proceeds to Step 601 in FIG. 20.

Figure 17B:
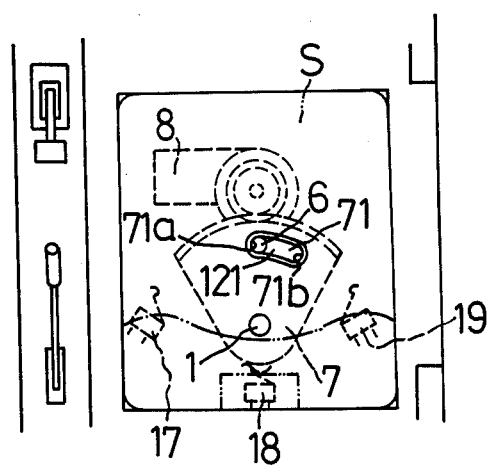
Figure 17C:
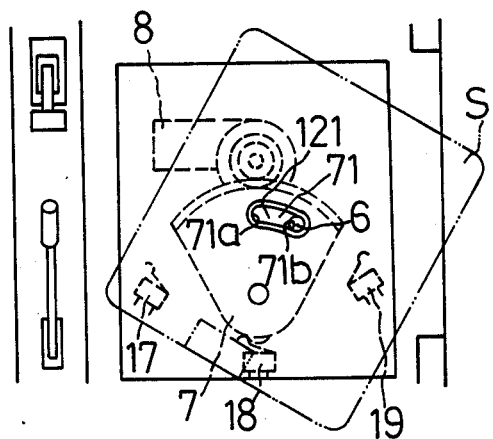

When an occupant is detected as sitting on the seat, motor 8 is rotated in the forward (normal) direction (Step 617) so as to drive engaging member 7 to the intermediate position where limit switch 18 operates (Step 620, Step 612). This is shown in FIG. 17B. In this state, the slot 71 completely registers with the slot 121, and thereby the engaging surfaces 71a and 71b are positioned not inside the relative locus of the rod-like member 6 and the rod-like member 6 is movable within the slot 121. Thereby, the seat cushion member S may be rotated by hand and the occupant twists his waist to rotate the cushion member S in the direction of the side door. This is shown in FIG. 17C. When the occupant dismounts the vehicle and closes the door B1, the process proceeds to Steps 613, 614 and 616 in that order, and consecutively proceeds to Step 701 in FIG. 19. In Step 701, the motor 8 is reversely rotated to rotate the engaging member 7 to the inner end where the limit switch 17 is actuated (Steps 704 and 705). During this process, the engaging surface 71b of the engaging member 7 comes into engagement with the rod-like member 6, and as the engaging member 7 moves, the seat cushion member S is inwardly rotated and returns to its original forward-facing position in FIG. 17A.

In Steps 618, 619, 702 and 703, the current value Im during the rotation of the motor is detected, and if this value exceeds the allowable value Io, an overload of the motor is detected so that the motor 8 is stopped (Steps 621 and 707). After the motor has been stopped, a depression of the reset switch 52 is detected, and then the motor 8 is again rotated (Step 701).

Figure 17D:
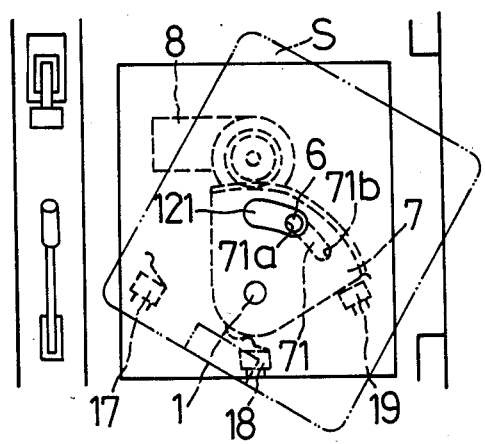
Figure 18:
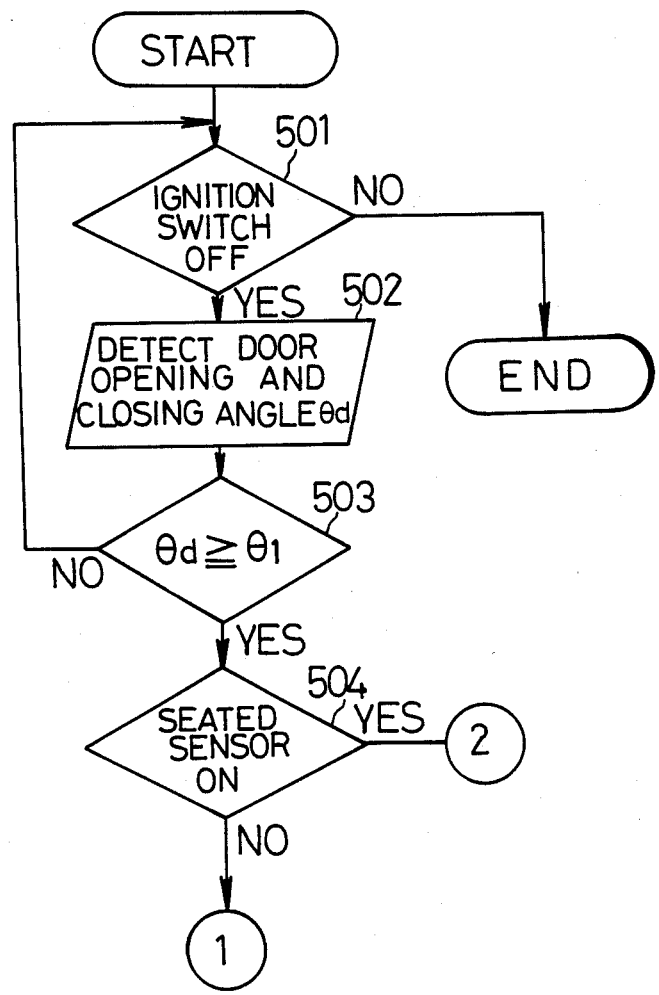
Figure 20:
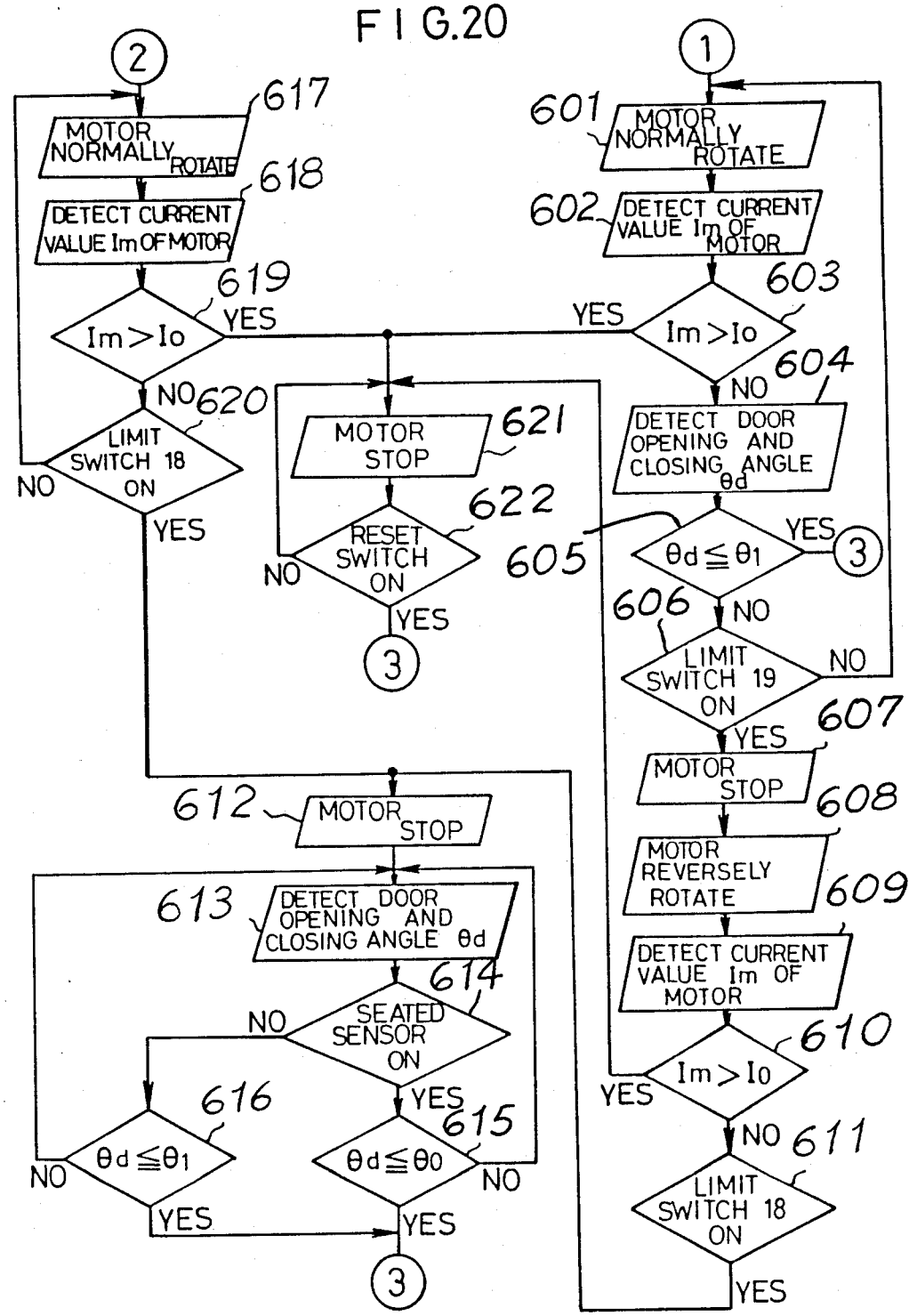

In Step 504 of FIG. 18, when the occupant is not seated, that is where the occupant is about to mount the vehicle, the motor 8 normally rotated in Step 601 of FIG. 20 to rotate and move the engaging member 7 to the outer end where the limit switch 19 is actuated (Steps 606 and 607). Halfway during this rotation, the engaging surface 71 of the engaging member 7 comes into engagement with the rod-like member 6, and as the engaging member 7 moves, the seat cushion member S is rotated outwardly toward the side door. This is shown in FIG. 17D. The motor 8 starts its reverse rotation immediately after the motor 8 has stopped in Step 607 (Step 608) to return the engaging member 7 to the intermediate point as shown in FIG. 17C (Steps 611 and 612).

In this state, the slots 71 and 121 again completely register with each other and the engaging surfaces 71a and 71b are positioned not inside the relative locus of the rod-like member 6, and the seat cushion member S may be rotated by hand. If the occupant twists his waist, the seat cushion member S rotates inwardly of the vehicle and return to its original forward-facing position (FIG. 17B). Here, when the door B1 is closed, the process proceeds from Step 613 to Step 615. When it is detected that the door opening and closing angle $\theta d$ is less than the angle $\theta o$ formed when the door is closed, the process proceeds to Step 701. In Steps 701 and following steps, the engaging member 7 is rotated toward the inner end as previously described (FIG. 17A), and the rod-like member 6 is pressed against the end of the slot 121 by the engaging surface 71b and the seat cushion member S assumes its locked state.

In Steps 604 and 605 of FIG. 20, when the door opening and closing angle $\theta d$ is detected as being less than the angle $\theta_1$, it is determined that the occupant has stopped mounting the vehicle, and the process proceeds to the program of FIG. 19 to return the seat cushion member S to the original forward-facing position. In Steps 602, 603, 609 and 610, an overload of the motor 8 is detected.

According to the above-described embodiment, when the door is opened at the start of the occupant mounting the vehicle, the seat cushion member S is automatically rotated in the direction of the side door and when the door is closed after the occupant has dismounted the vehicle, the seat cushion member S is automatically rotated in the forward direction of the vehicle and returns to the original forward-facing position. During the mounting and dismounting of the vehicle, seat cushion member S may be rotated by hand and rotated according to the movement of the occupant's waist. In this manner, trouble may be saved for the occupant to rotate the seat inwardly and outwardly by hand at the time of mounting and at the time of dismounting the vehicle, and in addition, the mounting and dismounting operation may be effected at the occupant's own pace.

If in the above-described embodiment, Step 504 in FIG. 18 is deleted, Steps 601 to 612 of FIG. 20 are executed irrespective of the presence or the seated condition of the occupant, and the seat may be automatically rotated even while the occupant dismounts the vehicle. Also, if Step 614 is set so that the flow chart of FIG. 19 is executed at the time when the seat sensor 51 changes from OFF to ON, the seat may be automatically rotated even when the occupant mounts the vehicle. If an arrangement is made so that a pattern select switch is provided to select a flow chart, the automatic or manual mode of the seat rotation may be suitably set by the occupant.

Figure 21:
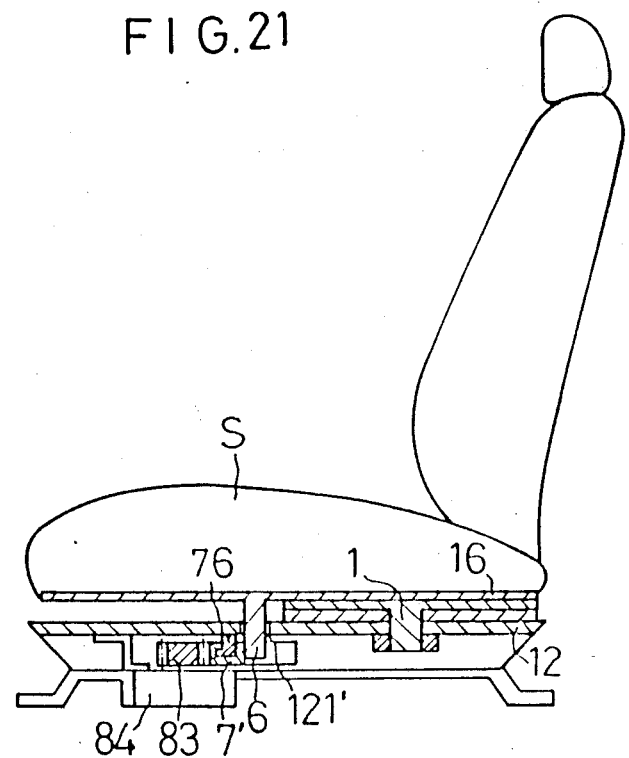
FIGS. 21 and 22 show a third embodiment of the present invention.
Figure 22:
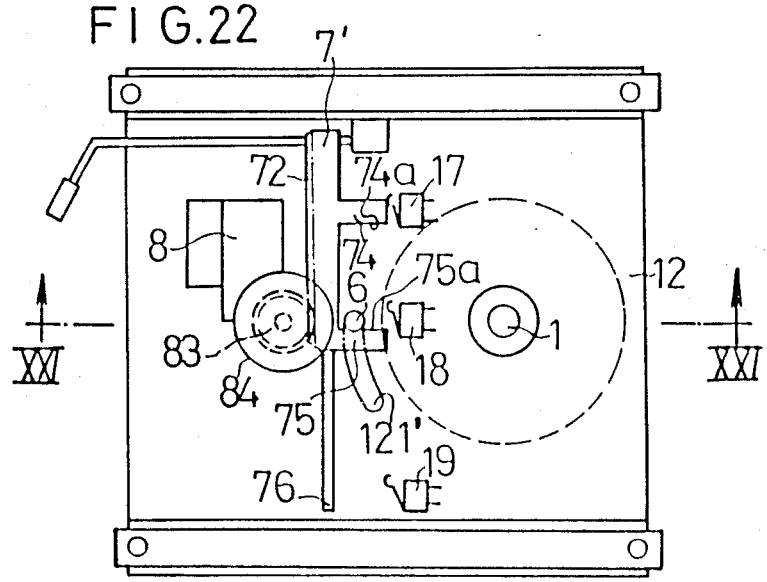

FIGS. 21 and 22 show a third embodiment of the present invention. In the figures, an engaging member 7 provided on the undersurface of the base plate 12 in the form of a long plate, which is fitted in a rail 76 disposed widthwise of the plate 12 and moved therealong. The engaging member 7' is formed at one side with a tooth profile 72, which is brought into engagement with a pinion 83. The engaging member 7' is projected at the other side with two projections 74 and 75, whose opposed surfaces form engaging surfaces 74a, 75a. The rod-like member 6 entends through the slot 121' and is positioned between the engaging surfaces 74a and 75a. The opposed spacing between the engaging surfaces 74a and 75a is made to be longer than the locus of the rod-like member 6 which moves within the slot 121'.

When the engaging member 7' is the illustrated position, the rod-like member 6 is pressed against one end of the slot 121 by the engaging surface 75a, and the seat cushion member S is directed toward the front of the vehicle and is placed in the locked state. At that time, the limit switch 17 is actuated by the projection 74.

When the pinion 83 is rotated to move the engaging member 7' until the projection 74 comes into contact with the limit switch 18, the rod-like member 6 becomes movable within the slot 121'. In this state, the seat cushion member S may be suitably rotated by hand.

When the engaging member 7' is further moved until the projection 75 comes into abutment with the limit switch 19, the rod-like member 6 is then pressed against the other end of the slot 121' by the engaging surface 74a, and the seat cushion member S is moved toward the side door and becomes locked. Even the construction of the present embodiment may obtain the effects similar to those of the second embodiment.

Thus, the engaging member is linearly moveable in a tangential direction of the locus of movement.

While in the above-described second and third embodiments, the rotating range of the seat cushion member S is restricted by the slot 121' through which the rod-like member 6 is inserted, it is to be noted that other stoppers can be provided instead of the aforesaid arrangement.

To detect the rotating position of the engaging member 7', a pulse generator or a potentiometer in place of a limit switch can be provided on the engaging member 7' or the motor 8.

It is to be noted further that a similar effect may be obtained by an arrangement wherein the rod-like member 6 is provided on the base plate 12 and engaging member 7' is provided on the support plate 16.

What is claimed is:

1. A rotary seat for a vehicle, comprising:
   a support shaft mounted upright on a floor of the vehicle;
   a seat cushion member rotatably supported on said support shaft;
   driving means connected to said seat cushion member for automatically rotating said seat cushion member between a direction toward a front of said vehicle and a direction toward a side door of said vehicle;
   means for disconnecting said driving means from said seat cushion member to allow said seat cushion member to be manually rotatable, said disconnecting means comprising a rodlike member providd on one of said vehicle floor and said seat cusion member eccentrically with a center of rotation of said seat cushion member, and a pair of engaging surfaces provided on the other one of said seat cushion member and said vehicle floor, said rodlike member having a locus of movement with respect to one of said vehicle floor and said seat cushion member, said engaging surfaces being movable along the locus of movement of said rod-like member, independently of movement of said seat cushion member, said engaging surfaces being separated by a distance substantially equal to a total range of movement of said rod-like member; and
   control means for controlling said riving means and said disconnecting means to place said seat cushion member in an automatic rotating mode or a manual rotating mode, and said control means including means for controlling said disconnecting means to place said seat cushion member in said automatic rotating mode by pushing said rod-like member with one of said engaging surfaces, and for placing said seat cushion member in said manual rotating mode by positioning said engaging surfaces at extreme ends of said locus of movement of said rod-like member.

2. The rotary seat as set forth in claim 1, wherein said driving means has an engaging member which is rotatable about said support shaft, said engaging surfaces being formed at both ends of an arc-shaped slot, which slot is provided in said engaging member along said locus of movement, and a motor for turning said engaging member in a clockwise and a counterclockwise direction independent of movement of said seat cushion member, said rod-like member having an extreme end inserted into said slot.

3. The rotary seat as set forth in claim 2, wherein said engaging member is in the form of a plate body having a sector, a center of which is rotatably connected to said support shaft with a rack formed on an outer circumferential surface, said slot being formed in the plate body, said plate body being rotated clockwise and counterclockwise by means of a pinion which is connected to said motor and meshed with said rack.

4. The rotary seat as set forth in claim 1, wherein said control means includes means for causing said motor to move said pair of engaging surfaces so as to be positioned at extreme ends of said locus of movement when said seat cushion member is occupied and when said vehicle side door is open beyond and predetermined angle.

5. A rotary seat according to claim 2 further including a base plate slidably mounted on side vehicle floor, said base plate having an arc-shaped hole which may be moved into registration with said arc-shaped slot of said engaging member at an intermediate moving position of said engaging member, said rod-like member being inserted into said arc-shaped hole of said base plate and into said arc-shaped slot of said engaging member.

* * * * *